US006973601B2

(12) United States Patent  (10) Patent No.: US 6,973,601 B2
Sabet et al.  (45) Date of Patent: Dec. 6, 2005

(54) SYSTEM AND METHOD FOR AUTOMATIC OPTIMIZATION OF OPTICAL COMMUNICATION SYSTEMS

(75) Inventors: Sameh A. Sabet, Howell, NJ (US); Karen K. Salcedo, Belford, NJ (US); Mark D. Tremblay, Neptune, NJ (US); Maryann Wronko, Spring Lake Heights, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 441 days.

(21) Appl. No.: 10/197,109

(22) Filed: Jul. 17, 2002

(65) Prior Publication Data

US 2003/0016695 A1   Jan. 23, 2003

Related U.S. Application Data

(60) Provisional application No. 60/306,567, filed on Jul. 19, 2001.

(51) Int. Cl.$^7$ .............................................. G06F 11/00
(52) U.S. Cl. ..................... 714/704; 714/712; 714/752
(58) Field of Search ................................ 370/465, 480; 359/124, 133, 110; 714/704, 752, 708, 712, 714/762

(56) References Cited

U.S. PATENT DOCUMENTS

| 6,031,644 A | 2/2000 | Utsumi |
| 6,219,162 B1 * | 4/2001 | Barnard et al. ................. 398/9 |
| 6,295,614 B1 * | 9/2001 | Peters et al. ................. 714/704 |
| 6,735,725 B1 * | 5/2004 | Wu et al. ..................... 714/704 |
| 6,742,154 B1 * | 5/2004 | Barnard ...................... 714/752 |
| 2003/0020983 A1 * | 1/2003 | Cai et al. .................... 359/124 |

FOREIGN PATENT DOCUMENTS

| EP | 0926854 | 6/1999 | .......... H04J 14/02 |
| WO | 0108422 | 2/2001 | |

* cited by examiner

*Primary Examiner*—Albert Decady
*Assistant Examiner*—Fritz Alphonse

(57) ABSTRACT

A method and apparatus for maintaining an established error count for data transmitted on a wavelength division multiplexed (WDM) optical communication network. Error counts from a forward error correction (FEC) code are monitored and operational parameters are automatically adjusted in response to the error counts, thereby achieving system optimization in an automated manner.

22 Claims, 14 Drawing Sheets

SYSTEM AND METHOD FOR AUTOMATIC OPTIMIZATION OF OPTICAL COMMUNICATION SYSTEMS

CROSS REFERENCE TO RELATED APPLICATIONS

The present application claims the benefit of U.S. Provisional Application Ser. No. 60/306,567, filed Jul. 19, 2001, the teachings of which are incorporated herein by reference.

FIELD OF THE INVENTION

The present invention relates to communications networks in general. More particularly, the invention relates to a system and method for automatic optimization of optical communication systems.

BACKGROUND OF THE INVENTION

The capacity of long-haul communication systems, such as "undersea" or "submarine" systems, has been increasing at a substantial rate. For example, some long-haul optically amplified undersea communication systems are capable of transferring information at speeds of 10 gigabits per second (Gbps) or greater in a single optical channel. In order to maximize the transmission capacity of an optical fiber network, a single fiber carries multiple optical channels in a process known as wavelength division multiplexing. For example, a single optical fiber might carry 64 individual optical signals in separate optical channels at corresponding wavelengths evenly spread in the low loss window of an optical fiber, for example between 1540 and 1564.8 nanometers (i.e., spread in channels on 0.4 nanometer centers).

Long-haul communication systems, however, are particularly susceptible to attenuation, noise and pulse distortion given the relatively long distances over which the signals must travel (i.e., generally 600 to 12,000 kilometers). These effects may be manifested in data transmission errors. However, the efficacy of any communication system is directly dependent upon the reliability with which data may be transmitted and received on the system.

In view of the fact that deleterious effects on transmitted signals cannot be entirely removed from any communication system, an approach in long haul systems has been to provide pre-compensation and post-compensation for such effects. For example, it is know to provide chromatic dispersion compensation at a transmitter and receiver to compensate for the differential in speed of travel for different wavelengths on an optical fiber. To accommodate for line attenuation, the transmitted optical signals may be transmitted at different signal levels in a method generally referred to as pre-emphasis. Other pre and post compensation techniques are known to those skilled in the art.

A difficulty with such compensation techniques, however, is that they require a cumbersome, time-consuming, expensive, and inefficient implementation. Each communication system is unique in terms of the distortion effects presented to optical signals transmitted thereon. Span length, amplifier configuration, channel count, transmission speed, etc., all effect signal transmission and can vary from system-to-system. As such, any pre and/or post compensation for a given system is necessarily implemented based on the specific system configuration. This requires a detailed analysis of system characteristics and a targeted approach toward providing compensation for each channel.

Generally, once a system is constructed the system performance is tested and compensation is manually adjusted on a channel-by-channel basis in an attempt to optimize system performance. Adjustments are manually made to compensation equipment, typically one channel at a time. For newly constructed system, this process of manually fine-tuning the system performance can take weeks or months. Also, once the system is operational it is typically necessary to periodically re-optimize the system to account for variations in the transmission anomalies and/or system compensation settings. This re-optimization process, again, must be done manually, one channel at a time.

Accordingly, it can be appreciated that a substantial need exists for a method and apparatus that allows for facile and efficient optimization of optical communication system parameters.

SUMMARY OF THE INVENTION

According to one aspect of the invention, there is provided a method of substantially maintaining an established error count for data transmitted on a WDM optical communication network. The method includes: obtaining a previous interval Forward Error Correction (FEC) error count associated with data transmitted on one of a plurality of channels of the network; comparing the previous interval FEC error count to a reference error count associated with the channel; adjusting one of a plurality of operational parameters associated with the channel in response to the comparison; and repeating the obtaining, comparing and adjusting steps to adjust each of the plurality of the operational parameters on an automatic periodic basis. The operational parameters may include channel signal level, transmitter parameters, and/or receiver parameters. A machine-readable medium whose contents cause a computer system to perform such a method is also provided.

According to another aspect of the invention, another method of substantially maintaining an established error count for data transmitted on a WDM optical communication network includes: obtaining a previous interval FEC error count associated with each of a plurality of channels of the network; identifying one of the channels having a highest associated one of the previous interval FEC error counts compared to the other ones of the channels; adjusting an operational parameter associated with the channel having the highest error count; repeating the obtaining, comparing and adjusting steps on an automatic periodic basis. A machine-readable medium whose contents cause a computer system to perform such a method is also provided.

BRIEF DESCRIPTION OF THE DRAWINGS

For a better understanding of the present invention, reference should be made to the following detailed description, which should be read in conjunction with the following figures wherein like numerals represent like parts.

DETAILED DESCRIPTION

Figure 1:
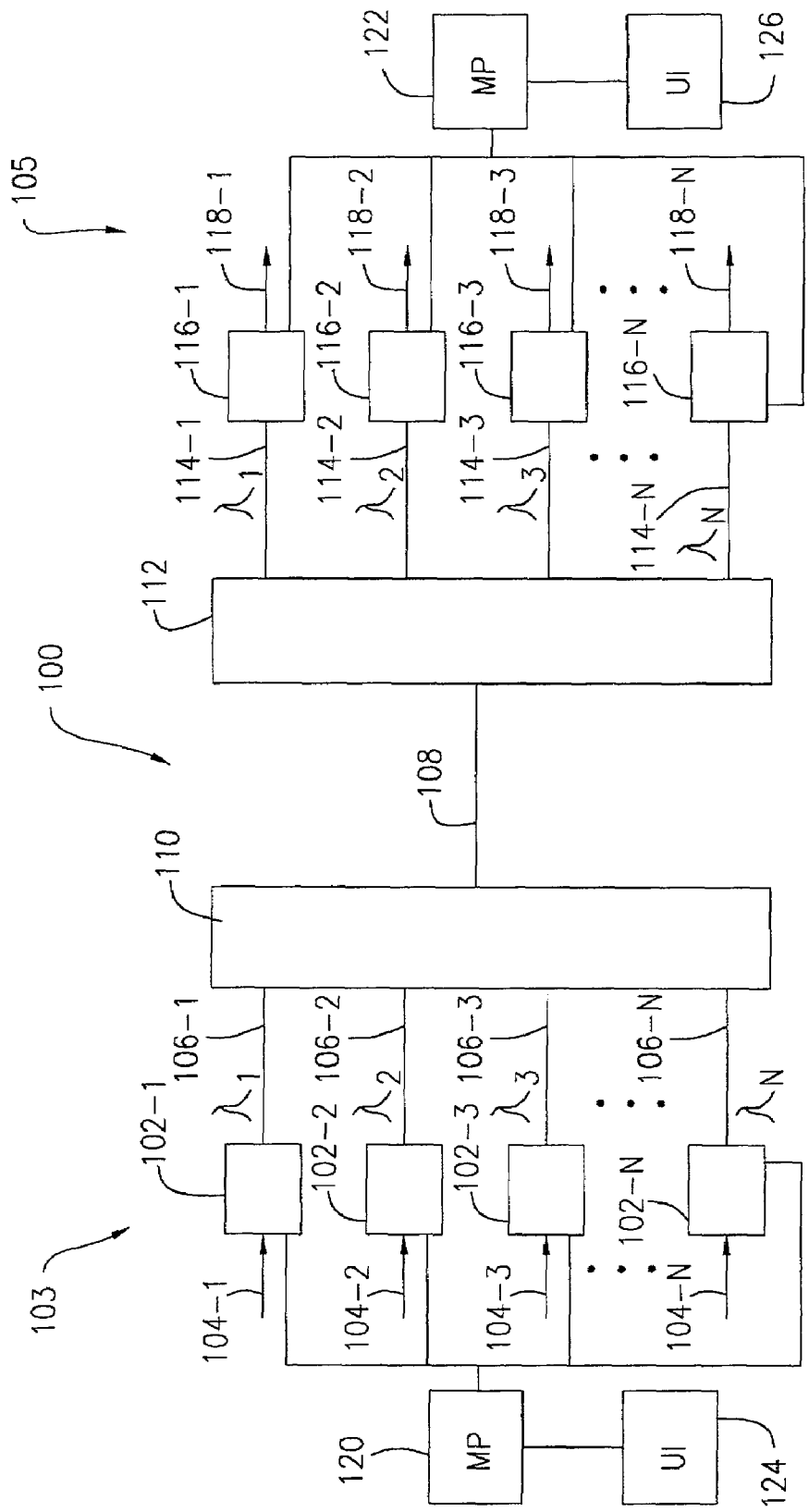
FIG. 1 illustrates an exemplary WDM system suitable for practicing one embodiment of the invention.

FIG. 1 shows a simplified block diagram of an exemplary wavelength division multiplexed (WDM) transmission system 100 consistent with the present invention. The transmission system serves to transmit a plurality of optical channels over an optical information channel 108 from a transmitting terminal 103 to one or more remotely located receiving terminals 105. Those skilled in the art will recognize that the system 100 has been depicted as a highly simplified point-to-point system form for ease of explanation. For example, the transmitting terminal 103 and receiving terminal 105 may, of course, both be configured as transceivers, whereby each may be configured to perform both transmitting and receiving functions. For ease of explanation, however, the terminals are depicted and described herein with respect to only a transmitting or receiving function. Thus, it is to be understood that a system and method consistent with the invention may be incorporated into a wide variety of network components and configurations. The illustrated exemplary embodiments herein are provided only by way of explanation, not of limitation.

In the illustrated exemplary embodiment, each of plurality of transmitters 102-1, 102-2, 102-3 ... 102-N receives a data signal on an associated input port 104-1, 104-2, 104-3, 104-N, and transmits the data signal on associated wavelength $\lambda_1, \lambda_2, \lambda_3, \ldots \lambda_N$. The transmitters, of course, are shown in highly simplified form for ease of explanation. Those skilled in the art will recognize that each transmitter may include electrical and optical components configured for transmitting the data signal at its associated wavelength with a desired amplitude and modulation.

The transmitted wavelengths or channels are respectively carried on a plurality of paths 106-1, 106-2, 106-3, 106-N. The data channels are combined into an aggregate signal on an optical information channel 108 by a multiplexer or combiner 110. The optical information channel 108 may include an optical fiber waveguide, optical amplifiers, optical filters, dispersion compensating modules, and other active and passive components.

The aggregate signal may be received at one or more remote receiving terminals 105. A demultiplexer 112 separates the transmitted channels at wavelengths $\lambda_1, \lambda_2, \lambda_3, \ldots \lambda_N$ onto associated paths 114-1, 114-2, 114-3, 114-N coupled to associated receivers 116-1, 116-2, 116-3, 116-N. Depending on system requirements, the receivers may recreate the data signals from the received channels and provide the data signals on associated output paths 118-1, 118-2, 118-3, 118-N.

In the illustrated exemplary embodiment, a maintenance processor (MP) 120, 122 is provided at each terminal 103, 105. Each maintenance processor may be controllable by an associated user interface (UI) 124, 126, which may include a user input device, such as keyboard, and a display. The user interface for each terminal may be local to the terminal or may be remotely connected thereto by a communication network.

The operation and function of the maintenance processors will be understood by those skilled in the art. With reference to the terminal 103, for example, the maintenance processor may be configured to control the operational parameters of each transmitter. The controllable operational parameters at the transmitter may include, for example, wavelength, amplitude, return-to-zero (RZ) coefficient, phase modulation magnitude and phase angle.

The maintenance processor 120 at the receiving terminal 105 may be configured to control the operational parameters of each receiver. The controllable operational parameters at the receiver may include, for example, clock and data recovery (CDR) sampling phase, limiting amplifier threshold, and CDR decision threshold. In an embodiment wherein the terminals 103 and 105 are configured as transceivers, the MP at each terminal would be configured to control both the transmitting operational parameters and the receiving operational parameters depending on operation of the terminal. Those skilled in the art will also recognize that the maintenance processor may be configured as a single processor for controlling each transmitter, as shown, or may be configured a separate processor associated with each transmitter. In addition, the maintenance processors may be placed in master/slave conditions where one of the processors controls operation of other processors.

In general, a system and method consistent with the invention provides automated system optimization through automated adjustment of system transmitting and receiving operational parameters. Automated adjustment of system operational parameters may be accomplished by software adapted to be executed by the maintenance processors. Following system installation or reconfiguration, a user may initiate setup adjustments through the user interface to cause initial adjustment and optimization of the system transmitting and receiving parameters and pre-emphasis settings. Also, the system may be configured to execute automatic background adjustments during system operation. Background adjustments may be configured to execute on a periodic basis to maintain system optimization, thereby accounting for system performance variation resulting from environmental changes, such as temperature fluctuation, or system malfunction or wear.

Consistent with the invention, automated optimization may be achieved through use of error counts generated by a FEC technique incorporated into the system. Those skilled in the art will recognize that FEC is essentially the incorporation of a suitable code into a data stream, for the detection and correction of data errors by the system's receiver. A transmitter receives a data stream and encodes the data stream using an FEC encoder. The FEC encoder generates a code for a block of data, which is appended to the block of data. The transmitter sends the encoded block of data over the network. A receiver receives the encoded block of data and passes it through an FEC decoder. The FEC decoder recovers the code and uses it to detect and correct any errors within the received block of data. The number of errors, i.e. the error count (EC), detected by the FEC decoder is reported to the system maintenance processor.

Any FEC error correcting code may be used in a system consistent with the invention for optimizing system operational parameters. Useful error correcting codes include, but are not limited to: Hamming codes, BCH codes, Viterbi codes, Golay and Fire codes, turbo codes, and concatenated codes. Of course, system hardware and software configuration will vary depending on the code selected.

Figure 2:
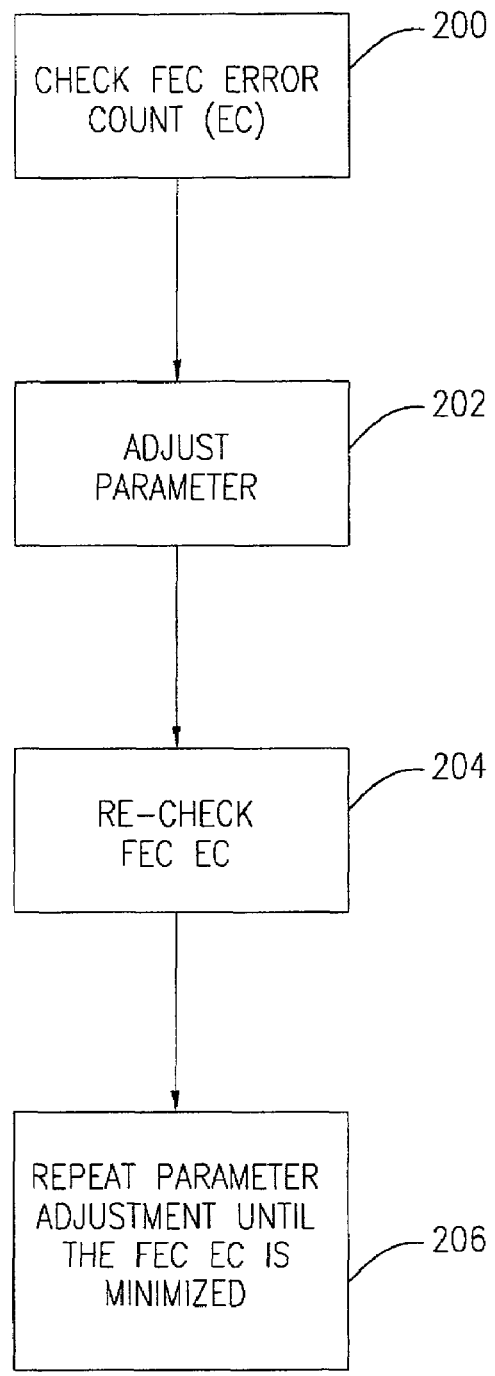
FIG. 2 is a flow chart of an exemplary method consistent with the invention.

Generally, a system consistent with the invention monitors the error count from the FEC code and adjusts operational parameters to minimize the reported error count, thereby achieving system optimization in an automated manner. FIG. 2 is a flow chart of a method consistent with the present invention. As shown, the maintenance processor may check the FEC error count 200 and cause an adjustment 202 of an operational parameter at one or more of the transmitters/receivers. Following parameter adjustment, the system may re-check 204 the error count to determine the effect of the adjustment on system errors. The process of adjustment and checking error counts may be repeated 206 until error count is minimized.

Interaction between operational parameters may be minimized by adjusting only one parameter at a time, and by iteratively adjusting all parameters to obtain a global optimum. For example, channel pre-emphasis may be optimized first using the far end FEC error count. Pre-emphasis generally refers to a process by which the relative signal level of each channel is adjusted with respect to the other channels for purposes of obtaining the same end-to-end performance on all channels.

Transmitting operational parameters may then be adjusted in the following order: (1) wavelength; (2) RZ coefficient; (3) Phase modulation magnitude; and (4) Phase angle. Transmitting operational parameters may be adjusted using the far end FEC error count. Receiving operational parameters may then be adjusted in the following order: (1) CDR sampling phase; (2) Limiting amplifier Threshold; (3) CDR decision threshold. For setup adjustments, the CDR sampling phase may be adjusted again following adjustment of the CDR decision threshold. Receiving operational parameters may be adjusted using the near end FEC error count. Those skilled in the art will of course recognize that a system consistent with the invention is not limited to adjustment of any specific parameter and/or any specific order of adjustment. In fact, the adjusted parameters and the order of adjustment may be varied depending on system and/or user requirements.

Again, at least two basic adjustment types may be made in a system or method consistent with the invention: (1) setup adjustments; and (2) background adjustments. Setup adjustments may be user-initiated, typically following system installation or repair. The setup adjustments may use, for example, 1-second FEC line error performance data for quickly setting operational parameters to an optimized setting. The background or periodic adjustments may be enabled or disabled for a particular system, and may be automatic fine adjustments to operational parameters made periodically and based on, for example, 15-minute FEC line error performance data. The maintenance processor may be responsible for carrying out both adjustment types in response to software instructions.

Figure 3:
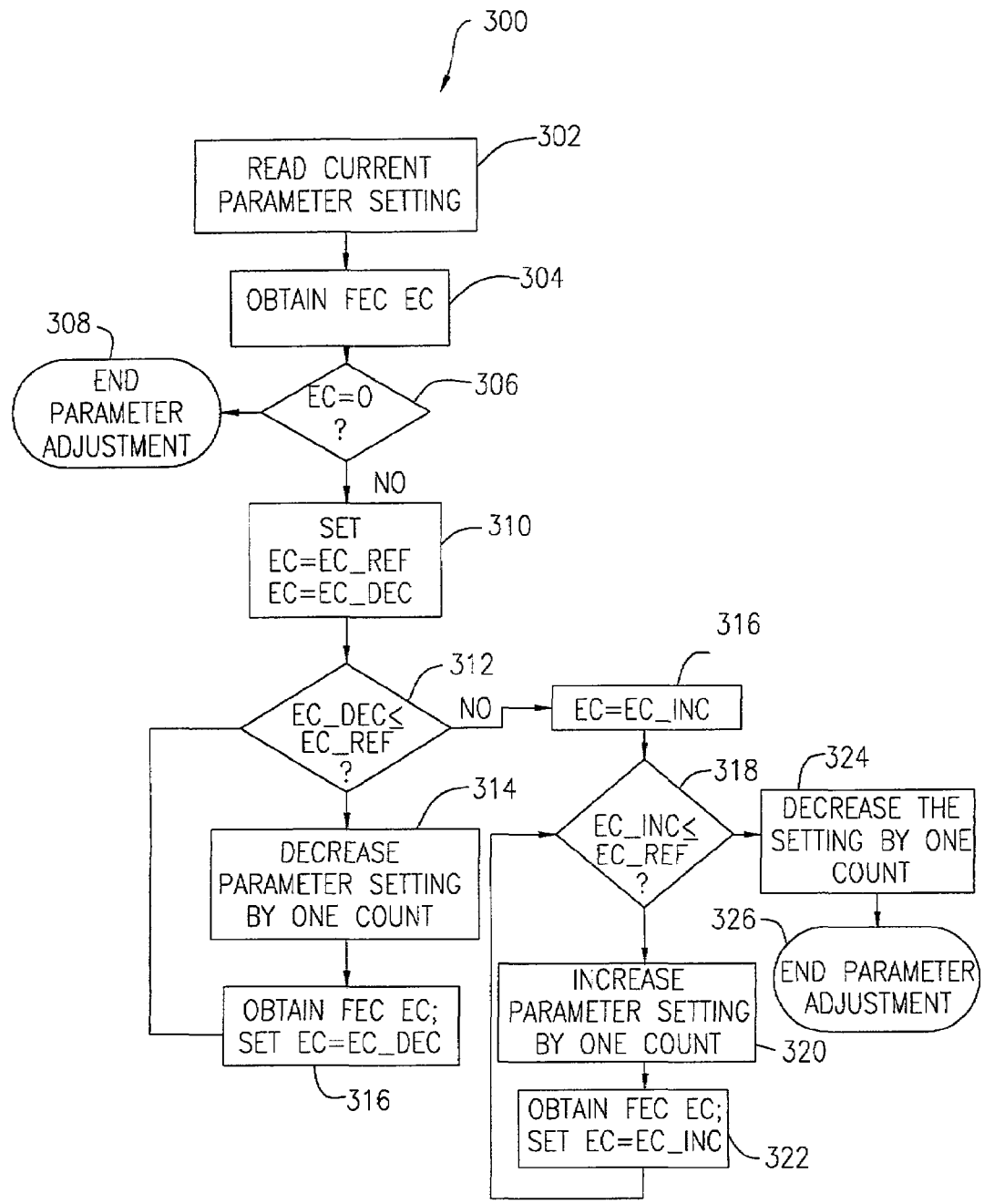
FIG. 3 is a flow chart illustrating one exemplary method for performing setup adjustments of transmit and receive parameters consistent with the invention.

An exemplary embodiment of the transmit and receive setup adjustment operations performed by a system consistent with the invention is illustrated in FIG. 3. Those skilled in the art will recognize that there are a variety of ways to achieve parameter optimization using FEC error counts in a manner consistent with the invention. The illustrated exemplary embodiments are thus not meant to be limiting.

In the illustrated exemplary embodiment, one parameter at a time may be adjusted on a channel-by-channel basis. Because the operational parameters affect each other, adjustment of all parameters may be iteratively performed, e.g., N times. The number N of iterative adjustments may be varied depending on system configuration, and may be set by a user. As shown, for each parameter the maintenance processor may read 302 the current parameter setting, e.g., the factory setting for the parameter. The FEC error count (EC) for the channel associated with the parameter may then be obtained 304. If the error count is zero 306, then the parameter adjustment for that channel may be terminated 308. Otherwise, the error count may be stored 310 as EC_ref and EC_dec.

While EC_dec is less than or equal to EC_ref 312, the system may decrease the parameter setting by one count 314, obtain the FEC EC and then set the new error count to EC_dec 316. When EC_dec is not less than or equal to EC_ref, then the EC may be stored 316 as EC_inc. While EC_inc is less than or equal to EC_ref 318, the system may increase the parameter setting by one count 320, obtain the FEC EC and then set the new error count to EC_inc 322. When EC_inc is not less than or equal to EC_ref, the setting may be decreased by one count 324 and the adjustment for that parameter may be ended 326.

The amount by which each parameter is increased or decreased during an adjustment will depend on the parameter and the system settings. Resolution of parameter setting is improved by using only minor parameter adjustments, with the tradeoff being that the number of iterative adjustments may be relatively high to achieve system optimization using small parameter adjustments. Using larger parameter adjustments may minimize the number of iterations required, but may not yield the same system performance as smaller adjustments. Thus, the amount of adjustment for each parameter may be selected for a given system based on the system error requirements and, of course, the parameter adjustments level allowed by the hardware associated with the specific parameter.

The setup adjustments for pre-emphasis may vary somewhat from the transmit and receive operational parameter adjustments because pre-emphasis is directed to adjusting the relative signal level of each channel respect to the other channels to obtain the same end-to-end performance on all channels. Thus, in pre-emphasis adjustments, the error counts associated with all channels is of importance when considering pre-emphasis adjustment of a single channel.

Pre-emphasis adjustment to achieve system optimization consistent with the invention may be accomplished in a variety of ways. FIGS. 4A–4D provide flow charts illustrating an exemplary pre-emphasis adjustment method 400 consistent with the invention. In the illustrated exemplary embodiment, the basic premise may be viewed as "robbing" signal level from the "rich" channels to give to the "poor" channels.

As shown, a per channel optimization (PCO) index counter is set to 1. The PCO counter may be used to keep track of the number of times the loop has been entered for a particular channel. If the PCO reaches a predetermined number, e.g., 3, then the loop may be aborted. The last second FEC error count may then be obtained 404 for all channels, and the channel with the lowest error count may be selected 406. If two or more channels have an equal error count, any one of the equal channels may be selected.

If the lowest channel error count is less 408 than a predetermined value X, then that channel's attenuation may be increased 410 by a predetermined amount, e.g., 0.5 dB, and flow may be returned to step 404. The predetermined value X may vary depending on system requirements and configuration. In one exemplary 2.5 Gb/s system, the value X may be 12, whereas in a 10 Gb/s system the value X may be set to 48. If the lowest channel error count is not less than X, then the channel with the highest error count may be selected 412. Again, if two or more channels have an equal error count, then any one of the channels with equal error count may be selected.

If the highest error count is less 414 than a predetermined value Y, then a backoff counter may be set to 0. The predetermined value Y may vary depending on system requirements and configuration. In one exemplary 2.5 Gb/s system, the value Y may be 48, whereas in a 10 Gb/s system the value Y may be set to 192. The normalized (e.g., in an exemplary 2.5 Gb/s system the error counts may be multiplied by four) average error count over all channels may be calculated and stored 418. This normalized average error count may be referred to as the "reference average error count" ($EC_{Ref}$).

The attenuation of all channels may then be decreased by a predetermined amount, e.g., 0.5 dB, and the backoff counter may be increased 422 by 0.5. If any channel attenuator has reached its minimum value 424 then the backoff counter may be returned 426, and the adjustment may be exited 428. Otherwise, the last second forward error FEC error count may again be obtained 430 for all channels, and the average error count may then be calculated 432 again over all channels. If the average error count is less than the reference average error count 434, then the new reference average error count may be set to equal the average error count 436 and flow may be returned to step 420. Otherwise, the backoff may be returned 438 and the adjustment may be exited 440.

If the highest error count is greater 414 than the value Y, and all error counts are not greater 442 than Y, then the highest errored channel's error count is temporarily stored as the reference error count. That channel's attenuation may then be decreased 446 by a predetermined amount, e.g., 0.1 dB. If the channel attenuator is at its minimum loss position 448, then the attenuation of all other channels may be increased 450 by the predetermined amount. The FEC error count for that channel is then obtained 452 and stored as the new error count. If the new error count is less than the channel's previous error count 454, flow is returned to step 404. Otherwise the attenuation for that channel may be increased 456 by a predetermined amount, e.g., 0.2 dB, and flow is returned to step 404.

If all error counts are not greater 442 than the predetermined value Y, then per channel optimization (PCO) may be performed 458, as will be described in greater detail below. At the end of per channel optimization, if 460 the PCO index is less than 3, PCO is incremented 462 by 1 and flow is returned to step 404. Otherwise, backoff 464 is returned to 0, and the adjustment is exited 466.

Figure 4A:
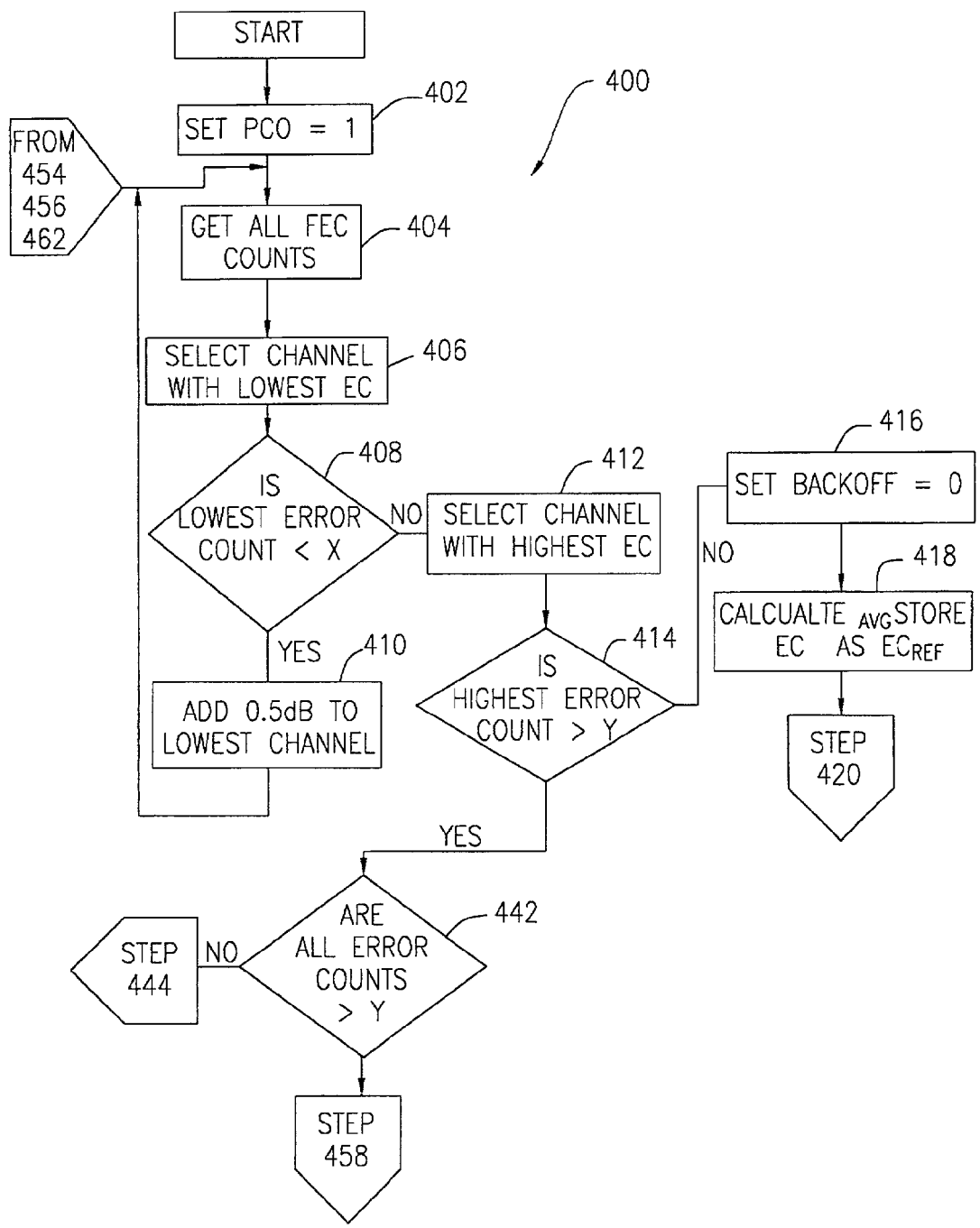
FIGS. 4A–4D provide flow charts illustrating one exemplary method for performing pre-emphasis setup adjustments consistent with the invention.
Figure 4B:
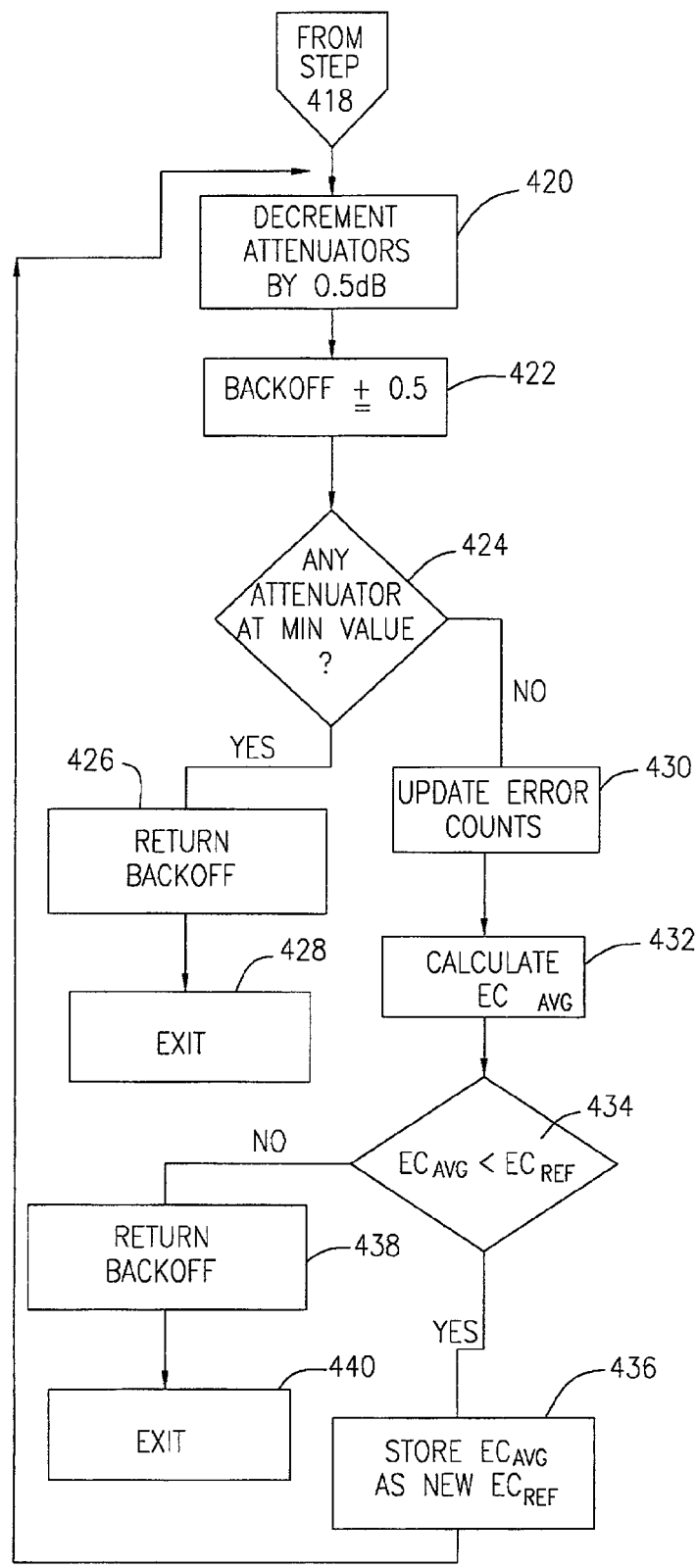
Figure 4C:
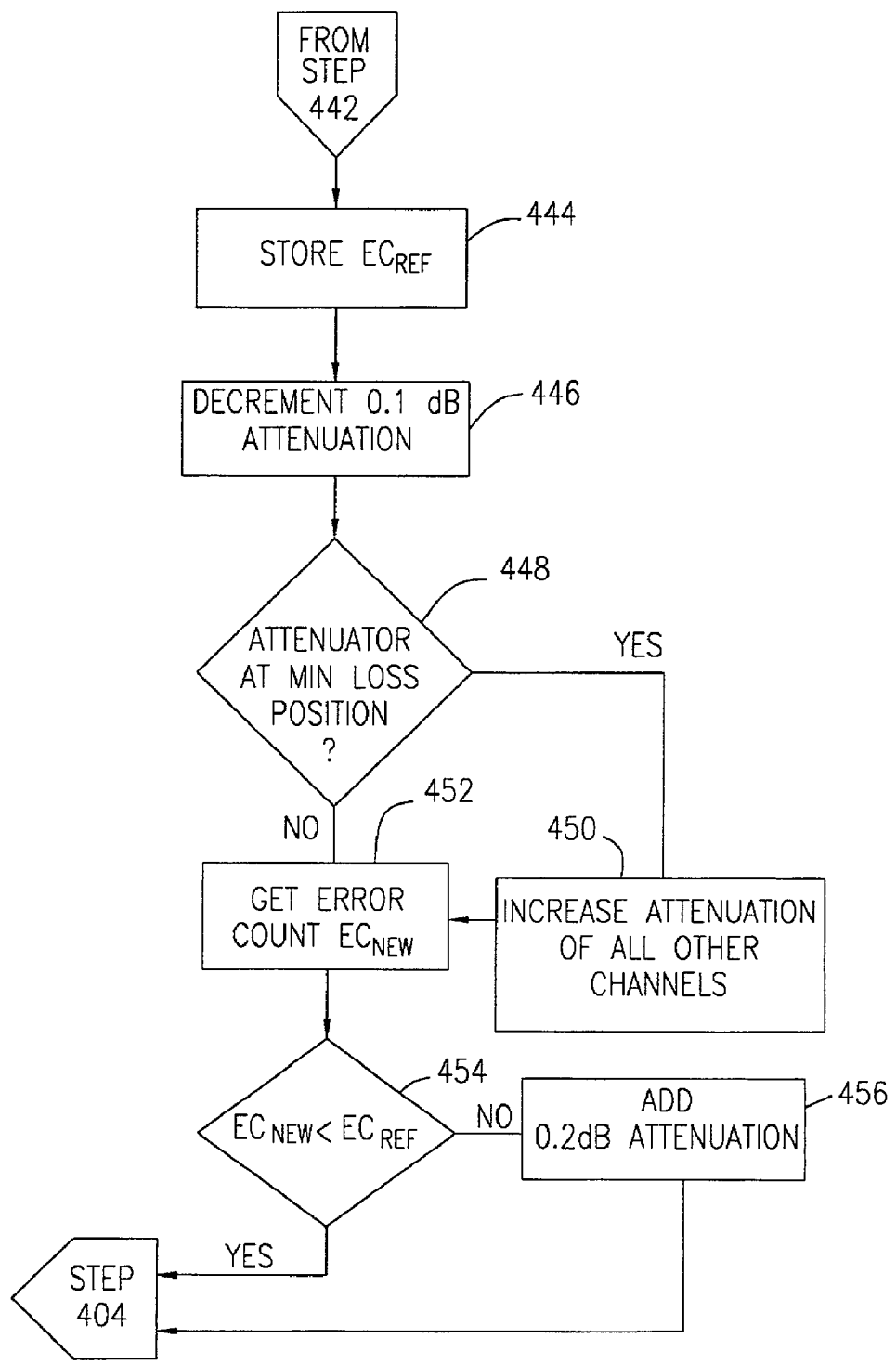
Figure 4D:
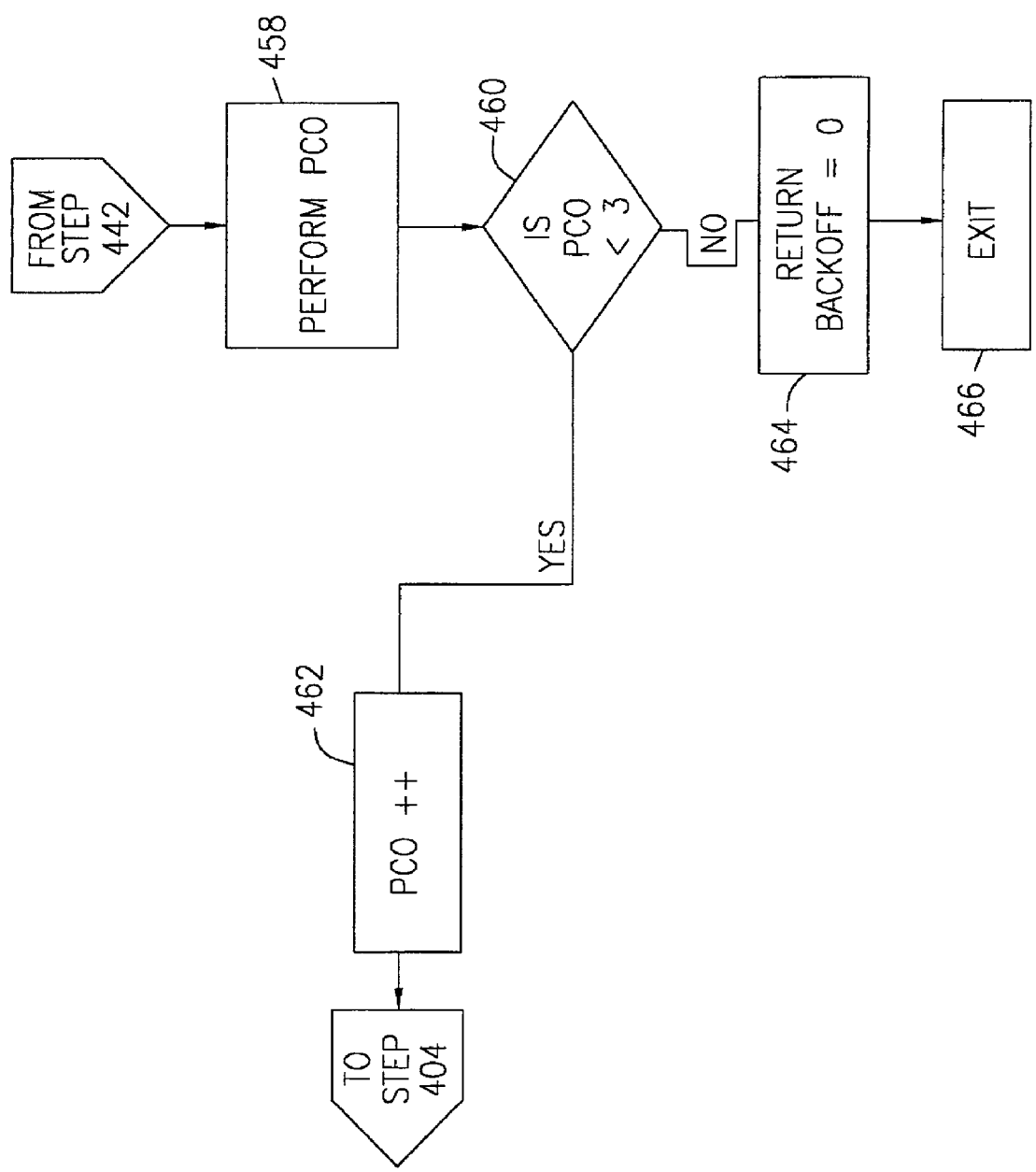
Figure 5A:
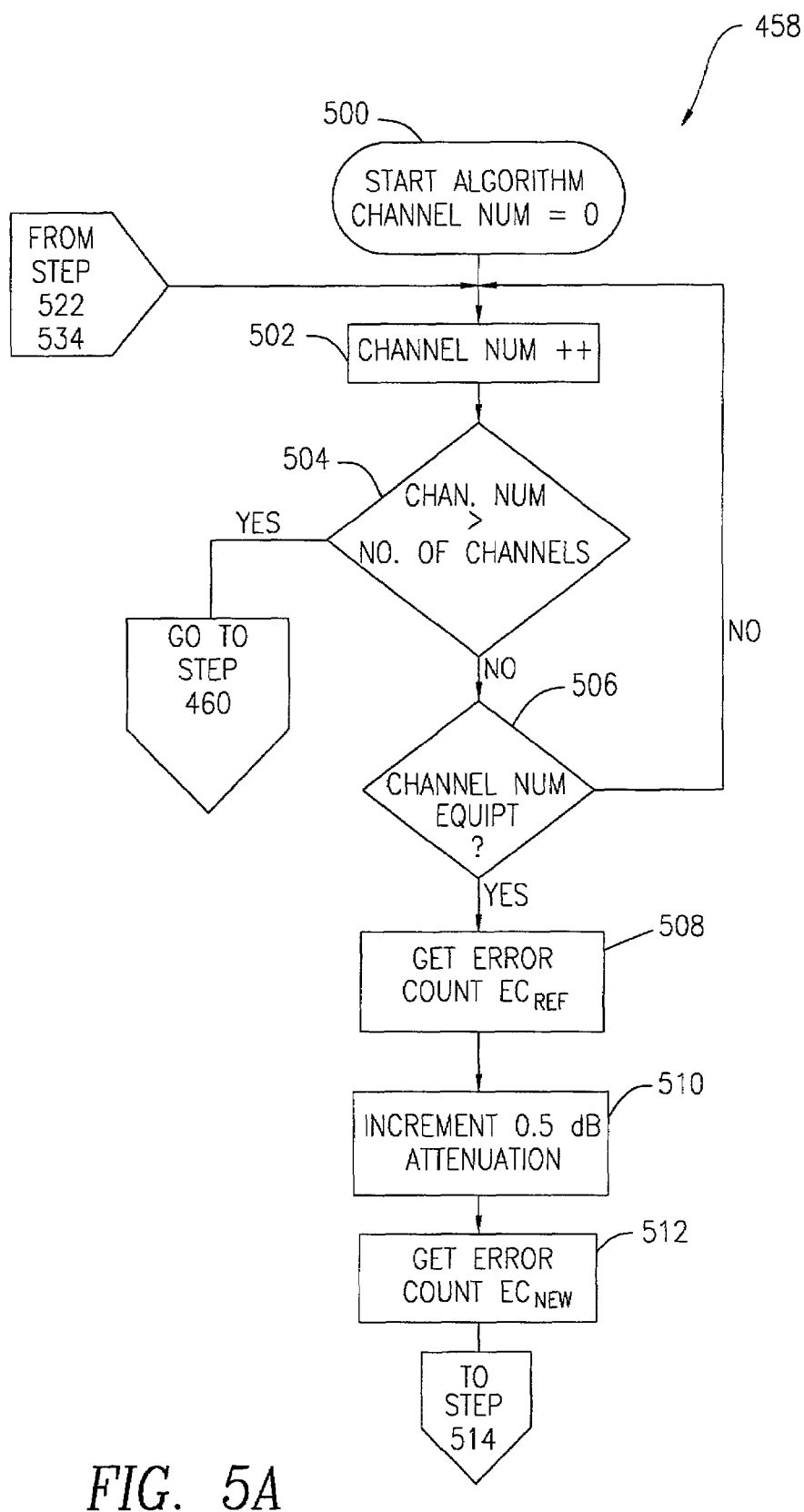
FIGS. 5A–5C provide flow charts illustrating one exemplary method for performing per channel optimization in a method of performing pre-emphasis setup adjustments consistent with the invention.
Figure 5B:
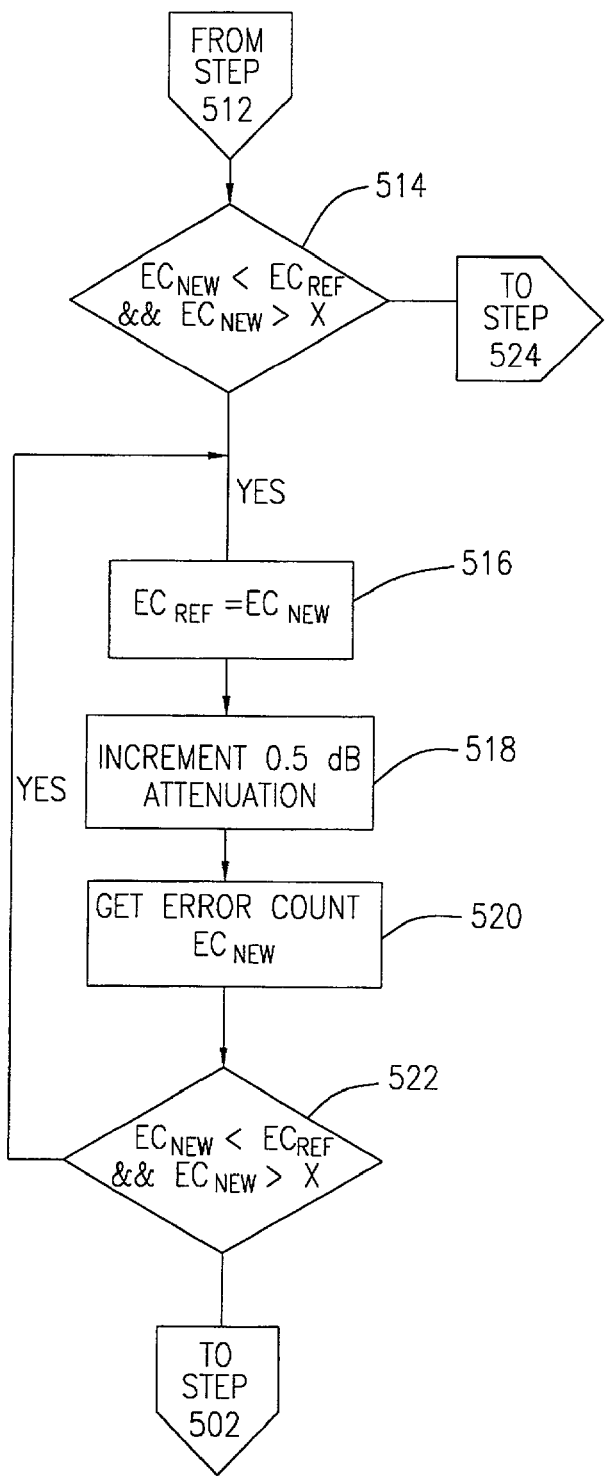
Figure 5C:
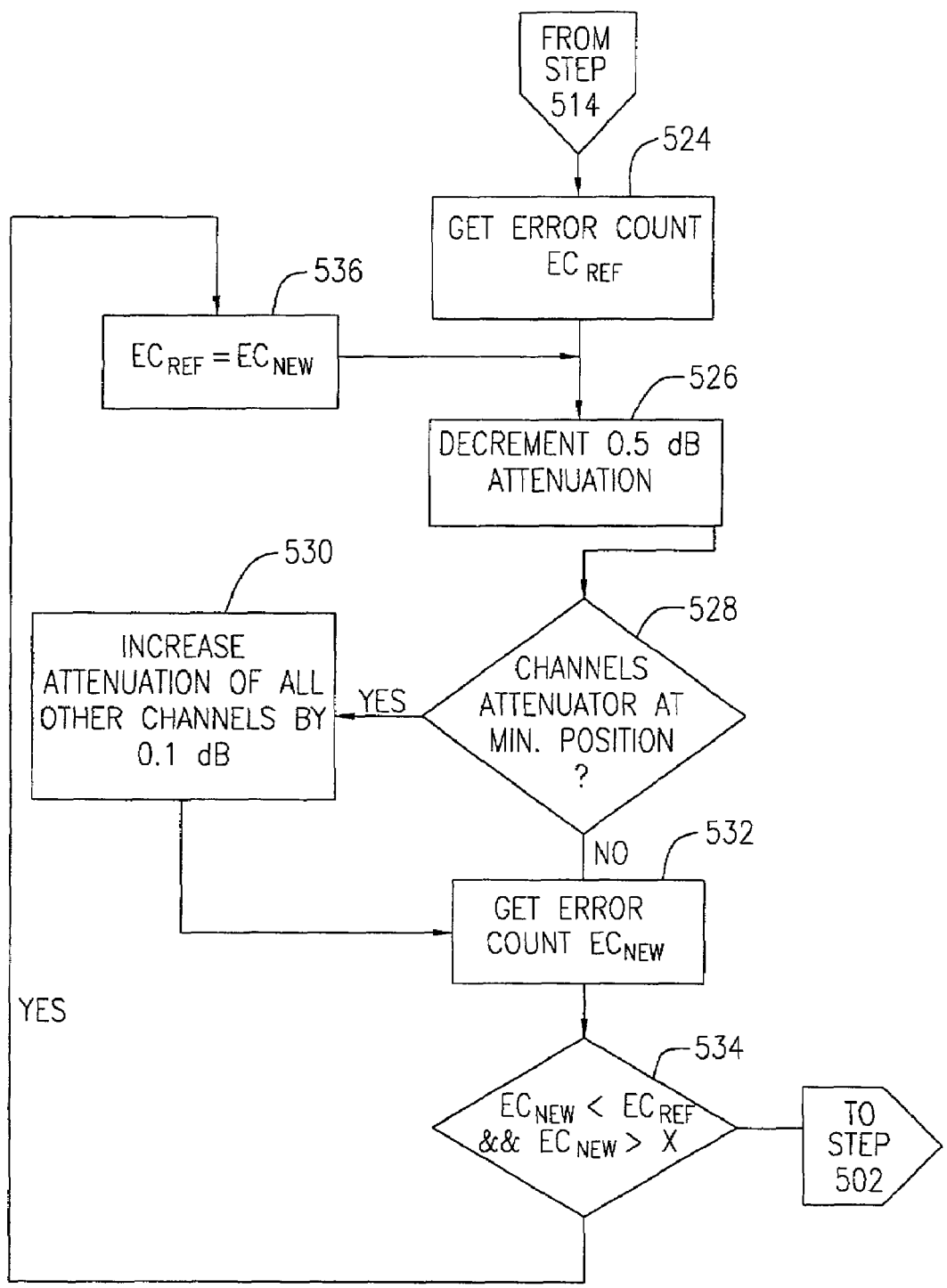

Flow charts for the exemplary per channel optimization step 458, shown in FIG. 4D, is provided in FIGS. 5A–5C. Again, those skilled in the art will recognize that the per channel optimization step 458 may be accomplished in a variety of ways. Thus, the process illustrated in FIGS. 5A–5C is provided by way of example only.

As shown, PCO may start 500 by setting the channel number to 0. The channel number may then be incremented 502 by 1. If the channel number is greater than the number of provisioned channels in the system 504, flow may be passed to step 460 (FIG. 4D), and if the channel number is not used in the system 506, flow may be returned to step 502. Otherwise, the channel error count is stored 508 as the reference error count, and the channel attenuation is increased 510 by a predetermined amount, e.g., 0.5 dB. The new channel error count is then obtained 512.

If the new channel error count is less than the reference channel error count 514, then the new channel error count is set as the reference channel error count 516, and the channel attenuation is increased by a predetermined amount 518, e.g., 0.5 dB. The new channel error count is then obtained. If the new channel error count is less than the reference error count 522, then flow is returned to step 502.

If the new error count at step 514 is not less than the reference error count, then the channel error count is obtained and set to the reference error count. The channel attenuation setting is decreased by a predetermined amount, e.g., –0.5 dB. If that channel's attenuator is at the minimum loss position 528, then the attenuation of all other channels may be increased 530 by a predetermined amount, e.g., 0.1 dB.

A new channel error count is then obtained 532. If the new error count is less than the reference error count and the error count is greater than a predetermined amount 534, e.g., 12 for a 2.5 Gb/s system or 48 for a 10 Gb/s system, then the new error count is set as the reference error count 536 and flow is be returned to step 526. Otherwise, flow is returned to step 502.

Turning now to the background or periodic adjustments, these adjustments may be provisioned for automatic operation so that no user intervention is required to initiate the background adjustments. The background adjustments provide periodic fine adjustments to pre-emphasis and the transmitting and receiving parameters to account for system performance variation due to environmental and/or operational changes. The background adjustments may use, for example, 15 minute FEC line error performance data for setting operational parameters to an optimized setting.

Figure 6:
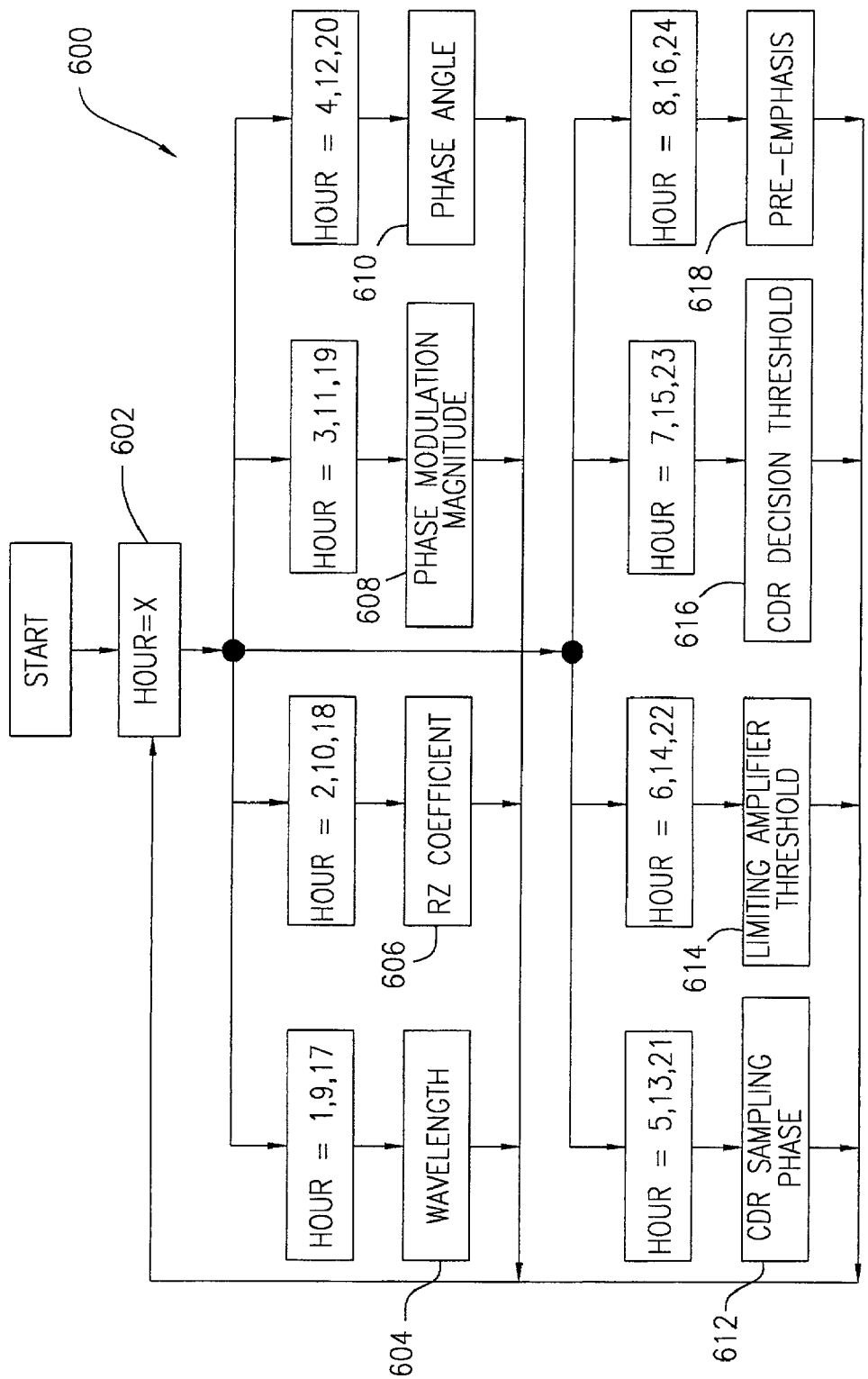
FIG. 6 is a flow chart illustrating one exemplary method for performing background adjustments consistent with the invention.

The background adjustments may be configured for execution at specific time intervals. FIG. 6, for example, illustrates in block flow form, timing for execution of background adjustments in one exemplary embodiment 600 consistent with the invention. As shown, under the control of the background adjustment software instructions, the processor may ascertain 602 the hour of operation X. For the transmit parameters adjustment timing may be as follows: wavelength 604 may be adjusted at hours 1, 9, and 17; RZ coefficient 606 may be adjusted at hours 2, 10, and 18; phase modulation magnitude 608 may be adjusted at hours 3, 11 and 19; and phase angle 610 may be adjusted at hours 4, 12 and 20. For the receive parameters adjustment timing may be: CDR sampling phase 612 may be adjusted at hours 5, 13, and 21; limiting amplifier threshold 614 may be adjusted at hours 6, 14, and 22; CDR decision threshold 616 may be adjusted at hours 7, 15 and 23. Pre-emphasis periodic adjustments 618 may be adjusted at hours 8, 16, and 24.

Figure 7:
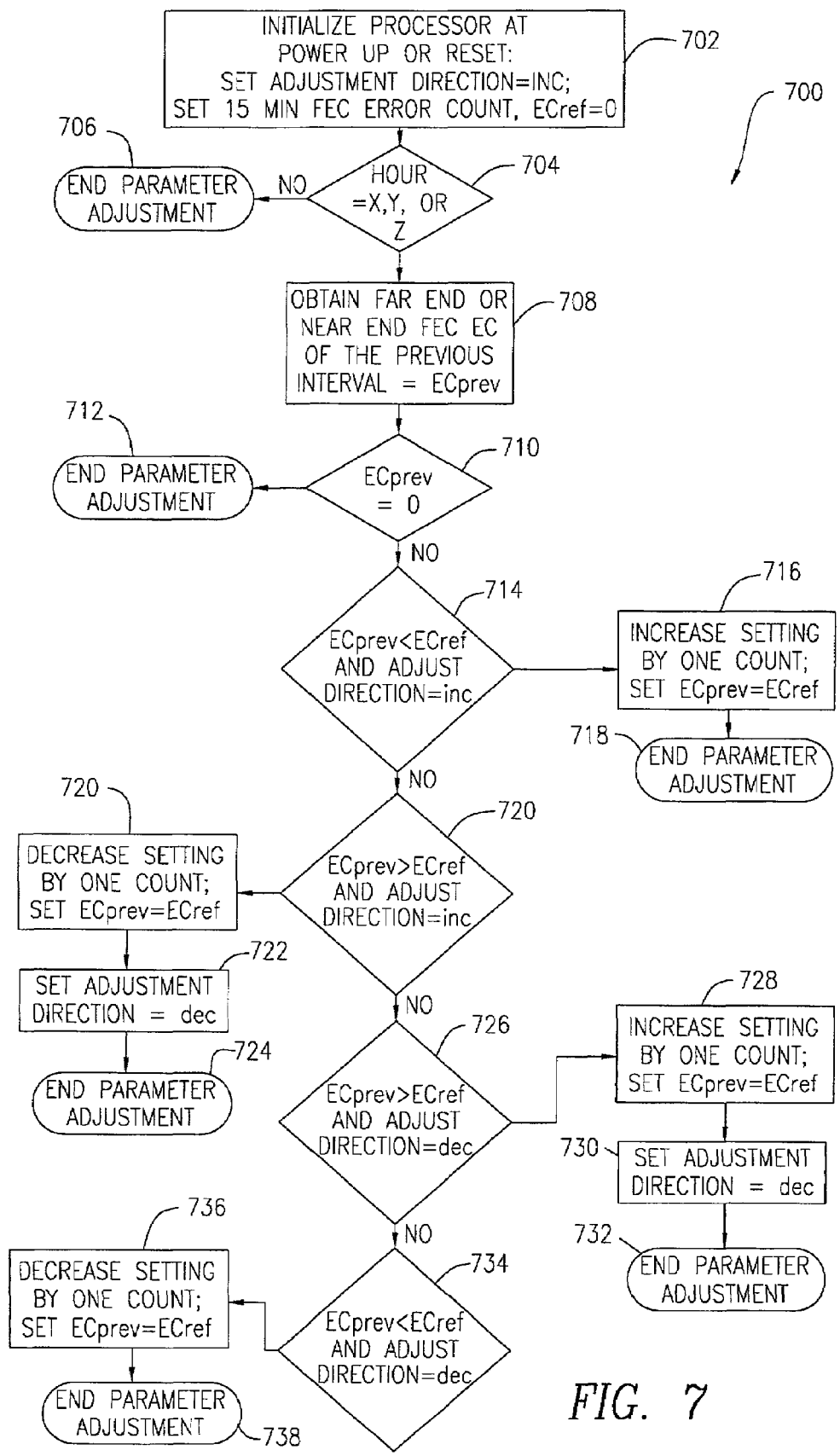
FIG. 7 is a flow chart illustrating one exemplary method for performing background adjustments of transmit and receive parameters consistent with the invention.

FIG. 7 is a flow chart illustrating one exemplary embodiment of periodic transmit and receive parameter adjustments consistent with the present invention. Again, those skilled in the art will recognize that the transmit and receive parameters may be periodically adjusted in a variety of ways consistent with the invention. It is to be understood, therefore, that the exemplary embodiment of FIG. 7 is provided only by way of illustration.

As shown, at the start of periodic transmit and receive parameter adjustments, the adjustment direction may be set to increase 702 and the 15-minute FEC error count reference may be set to 0. If the hour of operation corresponds 704 to a predetermined hour, e.g., x, y, z, for adjustment of a particular parameter, then the parameter is adjusted. Otherwise the parameter is not adjusted 706.

If the parameter is set for adjustment at the current hour, then the error count of the previous 15-minute interval is obtained 708. If the previous interval error count 710 is 0, then the parameter adjustment is terminated 712. Otherwise, if the previous interval error count is less than the reference error count and the adjustment direction is set to increase 714, then the parameter setting is increased by one count and the reference error count is set to the previous interval error count 716. The parameter adjustment is then ended 718.

If the previous interval error count is not less than the reference error count or the adjustment direction is not set to increase 714, then flow goes to step 720. At step 720 if the previous interval error count is greater than the reference error count and the adjustment direction is set to increase, then the parameter setting is decreased by one count 720. The previous interval error count is set to the reference error count 720, and the adjustment direction is set to decrease 722. The parameter adjustment is then ended 724.

If the previous interval error count is not greater than the reference error count or the adjustment direction is not set to increase 720, then flow goes to step 726. At step 726 if the previous interval error count is greater than the reference error count and the adjustment direction is set to decrease, then the parameter setting is increased by one count 728. The previous interval error count is set to the reference error count 728, and the adjustment direction is set to decrease 730. The parameter adjustment is then ended 732.

If the previous interval error count is not greater than the reference error count or the adjustment direction is not set to decrease 726, then flow goes to step 734. At step 734 if the previous interval error count is less than the reference error count and the adjustment direction is set to decrease, then the parameter setting is decreased by one count 736 and the previous interval error count is set to the reference error count 736. The parameter adjustment is then ended 738.

Figure 8A:
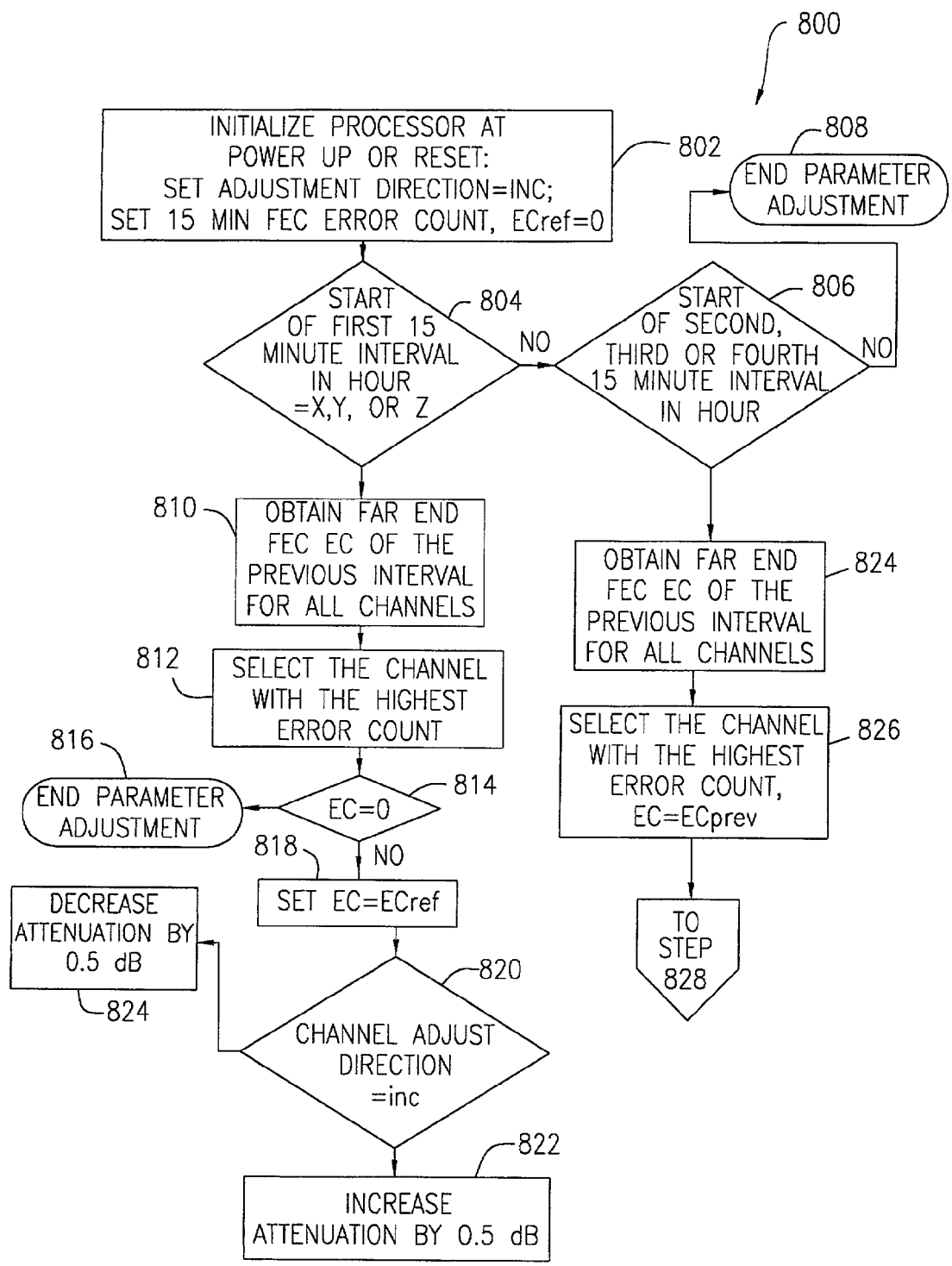
FIGS. 8A–8B provide flow charts illustrating one exemplary method for performing background pre-emphasis adjustments consistent with the invention.
Figure 8B:
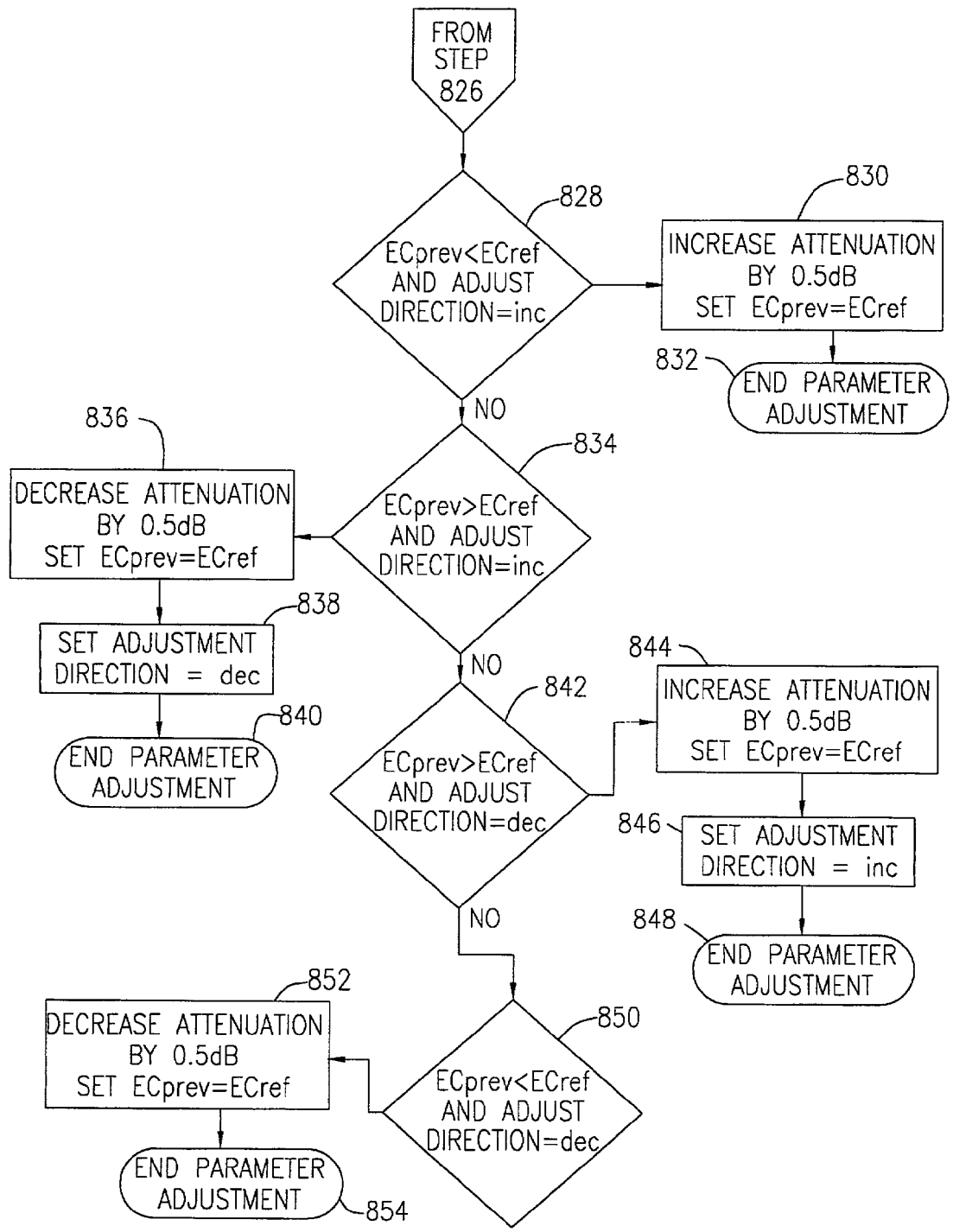

As with the setup adjustments, the periodic pre-emphasis adjustments may vary somewhat from the periodic transmit and receive parameter adjustments due to the goal in pre-emphasis of optimizing signal level across the provisioned channels. FIG. 8 is a flow chart illustrating one exemplary embodiment 800 of periodic pre-emphasis adjustments consistent with the present invention. Those skilled in the art will recognize that the periodic pre-emphasis adjustments performed in a variety of ways consistent with the invention. It is to be understood, therefore, that the exemplary embodiment of FIG. 8 is provided only by way of illustration.

As shown, at the start of periodic pre-emphasis adjustments, the adjustment direction may be set to increase 802 and the 15-minute FEC error count reference may be set to 0. If the hour of operation corresponds 804, 806 to a predetermined hour, e.g., x, y, z, for adjustment of a particular parameter, then the parameter is adjusted. Otherwise the parameter is not adjusted 808.

If the parameter is set for adjustment at the current hour, then if the hour is at the start of the first 15-minute interval in the hour 804, the far end error count of the previous 15-minute interval for all channels is obtained 810. In the illustrated exemplary embodiment, only the channel with the highest error count is selected for adjustment 812. If the previous interval error count 814 for that channel is 0, then the parameter adjustment is terminated 816. Otherwise, the error count for that channel is set as the reference error count 818. If the channel adjust direction is set to increase 820, then the attenuation of the channel is set to increase 822 by a predetermined amount, e.g., 0.5 dB. Otherwise, the attenuation of the channel is set to decrease 824 by the predetermined amount.

If the parameter is set for adjustment at the current hour, and the hour is at the start of the second, third or fourth 15 minute interval in the hour 806, the far end error count of the previous 15-minute interval for all channels is obtained 824, and the channel with the highest error count is selected for adjustment 826. If the previous interval error count is less than the reference error count and the adjustment direction is set to increase 828, then the attenuation is increased by the predetermined amount, and the reference error count is set to the previous interval error count 830. The parameter adjustment is then ended 832.

If the previous interval error count is not less than the reference error count or the adjustment direction is not set to increase 828, then flow goes to step 834. At step 834 if the previous interval error count is greater than the reference error count and the adjustment direction is set to increase, then the attenuation is decreased by the predetermined amount 836. The previous interval error count is set to the reference error count 836, and the adjustment direction is set to decrease 838. The parameter adjustment is then ended 840.

If the previous interval error count is not greater than the reference error count or the adjustment direction is not set to increase 834, then flow goes to step 842. At step 842 if the previous interval error count is greater than the reference error count and the adjustment direction is set to decrease, then the attenuation is increased by the predetermined amount 844. The previous interval error count is set to the reference error count 844, and the adjustment direction is set to increase 846. The parameter adjustment is then ended 848.

If the previous interval error count is not greater than the reference error count or the adjustment direction is not set to decrease 842, then flow goes to step 850. At step 850 if the previous interval error count is less than the reference error count and the adjustment direction is set to decrease, then the attenuation level is set to decrease by 0.5 dB and the previous interval error count is set to the reference error count 852. The parameter adjustment is then ended 854.

It will be appreciated that the functionality described for the embodiments of the invention may be implemented in hardware, software, or a combination of hardware and software, using well-known signal processing techniques. If in software, a processor and machine-readable medium is required. The processor can be any type of processor capable of providing the speed and functionality required by the embodiments of the invention. For example, the processor could be a process from the Pentium® family of processors made by Intel Corporation, or the family of processors made by Motorola. Machine-readable media include any media capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM), and any other device that can store digital information. In one embodiment, the instructions are stored on the medium in a compressed and/or encrypted format.

As used herein, the phrase "adapted to be executed by a processor" is meant to encompass instructions stored in a compressed and/or encrypted format, as well as instructions that have to be compiled or installed by an installer before being executed by the processor. Further the processor and machine-readable medium may be part of a larger system that may contain various combinations of machine-readable storage devices through various I/O controllers, which are accessible by the processor capable of storing a combination of computer program instructions and data. Finally, in another example, the embodiments were described in a communication network. A communication network, however, can utilize an infinite number of network devices configured in an infinite number of ways. The communication network described herein is merely used by way of example, and is not meant to limit the scope of the invention.

The embodiments that have been described herein are, thus, but some of the several that utilize this invention and are set forth here by way of illustration but not of limitation. It is obvious that many other embodiments, which will be readily apparent to those skilled in the art, may be made without departing materially from the spirit and scope of the invention.

What is claimed is:

1. A method of substantially maintaining an established error count for data transmitted on a WDM optical communication network, said method comprising:
    obtaining a previous interval FEC error count associated with data transmitted from a transmitter to a receiver on one of a plurality of channels of said network;
    comparing said previous interval FEC error count to a reference error count associated with said channel;
    adjusting one of a plurality of different operational parameters associated with said channel in response to a difference between said previous interval FEC error count and said reference error count, said plurality of different operational parameters including a channel pre-emphasis parameter, at least one operational parameter of said transmitter and at least one operational parameter of said receiver; and
    repeating said obtaining, comparing and adjusting steps to adjust each of said plurality of said different operational parameters associated with said channel on an automatic basis, whereby each of said different operational parameters is adjusted periodically at a different predetermined time.

2. A method according to claim 1, wherein said previous interval FEC error count is for a previous 15-minute FEC error count reporting interval.

3. A method according to claim 1, wherein said reference error count for each periodic adjustment comprises said previous FEC error count for a prior one of said periodic adjustments.

4. A method according to claim 1, wherein plurality of operational parameters comprises: wavelength, RZ coefficient, phase modulation magnitude, and phase angle.

5. A method according to claim 4, wherein said one of a plurality of different operational parameters comprises wavelength, and wherein said repeating step comprises repeating said obtaining, comparing and adjusting steps to adjust RZ coefficient, phase modulation magnitude, and then phase angle.

6. A method according to claim 1, wherein said plurality of different operational parameters comprises: CDR sampling phase, limiting amplifier threshold, and CDR decision threshold.

7. A method according to claim 6, wherein said one of a plurality of different operational parameters comprises CDR sampling phase, and wherein said repeating step comprises repeating said obtaining, comparing and adjusting steps to adjust limiting amplifier threshold and then CDR decision threshold.

8. A method according to claim 1, wherein said repeating step comprises repeating said obtaining, comparing and adjusting steps to adjust each of said plurality of said operational parameters for each of said plurality of channels on an automatic periodic basis.

9. A machine-readable medium whose contents cause a computer system to perform a method of substantially maintaining an established error count for data transmitted on a WDM optical communication network, said method comprising:
    obtaining a previous interval FEC error count associated with data transmitted from a transmitter to a receiver on one of a plurality of channels of said network;
    comparing said previous interval FEC error count to a reference error count associated with said channel;
    adjusting one of a plurality of different operational parameters associated with said channel in response to a difference between said previous interval FEC error count and said reference error count, said plurality of different operational parameters including a channel pre-emphasis parameter, at least one operational parameter of said transmitter and at least one operational parameter of said receiver; and
    repeating said obtaining, comparing and adjusting steps to adjust each of said plurality of said different operational parameters associated with said channel on an automatic basis, whereby each of said different operational parameters is adjusted periodically at a different predetermined time.

10. A machine-readable medium according to claim 9, wherein said previous interval FEC error count is for a previous 15-minute FEC error count reporting interval.

11. A machine-readable medium according to claim 9, wherein said reference error count for each periodic adjustment comprises said previous FEC error count for a prior one of said periodic adjustments.

12. A machine-readable medium according to claim 9, wherein said plurality of different operational parameters comprises: wavelength, RZ coefficient, phase modulation magnitude, and phase angle.

13. A machine-readable medium according to claim 12, wherein said one of a plurality of different operational parameters comprises wavelength, and wherein said repeating step comprises repeating said obtaining, comparing and adjusting steps to adjust RZ coefficient phase modulation magnitude, and ten phase angle.

14. A machine-readable medium according to claim 9, wherein said plurality of different operational parameters comprises: CDR sampling phase, limiting amplifier threshold, arid COR decision threshold.

15. A machine-readable medium according to claim 14, wherein said one of a plurality of different operational parameters comprises CDR sampling phase, and wherein said repeating step comprises repeating said obtaining, comparing and adjusting steps to adjust limiting amplifier threshold and then CDR decision threshold.

16. A machine-readable medium according to claim 9, wherein said repeating step comprises repeating said obtaining, comparing and adjusting steps to adjust each of said plurality of said operational parameters for each of said plurality of channels on an automatic periodic basis.

17. A method of substantially maintaining an established error count for data transmitted on a WDM optical communication network, said method comprising:
    obtaining a previous interval FEC error count associated with each of a plurality of channels of said network;
    identifying one of said channels having a highest associated one of said previous interval FEC error counts compared to the other ones of said channels;

adjusting one of a plurality of different operational parameters associated with said one of said channels in response to a difference between said highest associated one of said previous interval FEC error counts and a reference error count, said plurality of different operational parameters including a channel pre-emphasis parameter at least one operational parameter of said transmitter and at least one operational parameter of said receiver; and repeating said obtaining, comparing and adjusting steps to adjust each of said different operational parameters associated with said one of said channels on an automatic basis, whereby each of said different operational parameters is adjusted periodically at a different predetermined time.

18. A method according to claim 17, wherein said previous interval FEC error count is for a previous 15-minute FEC error count reporting interval.

19. A method according to claim 17, wherein said reference error count for each periodic adjustment comprises said highest associated one of said previous interval FEC error counts for a prior one of said periodic adjustments.

20. A machine-readable medium whose contents cause computer system to perform a method of substantially maintaining an established error count for data transmitted on a WDM optical communication network, said method comprising:

obtaining a previous interval FEC error count associated with each of a plurality of channels of said network;

identifying one of said channels having a highest associated one of said previous interval FEC error counts compared to the other ones of said channels;

adjusting one of a plurality of different operational parameters associated with said one of said channels in response to a difference between said previous interval FEC error count and a reference error count, said plurality of different operational parameters including a channel pre-emphasis parameter, at least one operational parameter of said transmitter and at least one operational parameter of said receiver; and repeating said obtaining, comparing and adjusting steps to adjust each of said different operational parameters associated with said one of said channels on an automatic basis, whereby each of said different operational parameters is adjusted periodically at a different predetermined time.

21. A machine-readable medium according to claim 20, wherein said previous interval FEC error count is for a previous 15-minute FEC error count reporting interval.

22. A machine-readable medium according to claim 20, wherein said reference error count for each periodic adjustment comprises said highest associated one of said previous interval FEC error counts for a prior one of said periodic adjustments.

* * * * *